P. HINKLEY.
Corn-Planter.
No. 18,450. Patented Oct. 20, 1857.
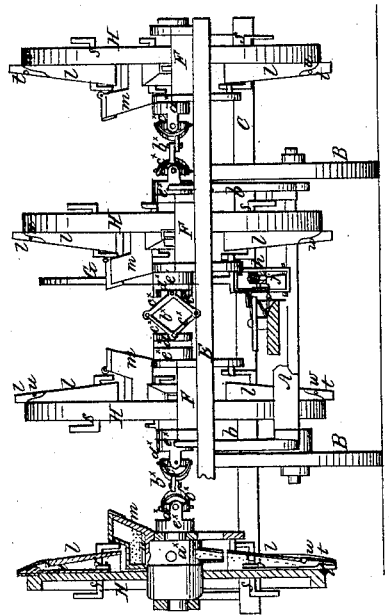
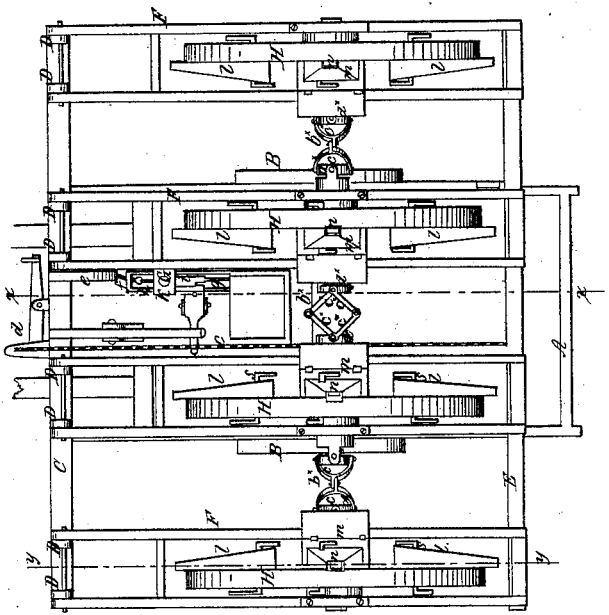
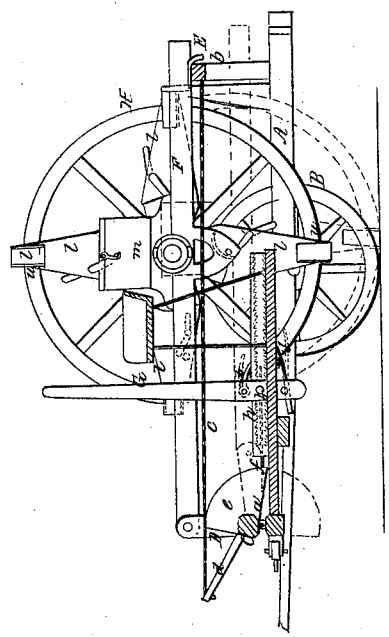
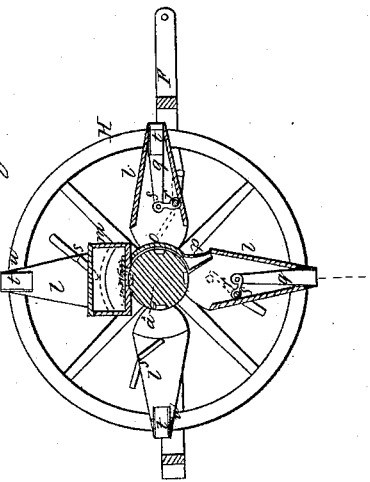

UNITED STATES PATENT OFFICE.

P. HINKLEY, OF CHARLESTON, ILLINOIS.

IMPROVEMENT IN SEED-PLANTERS.

Specification forming part of Letters Patent No. 18,450, dated October 20, 1857.

*To all whom it may concern:*

Be it known that I, P. HINKLEY, of Charleston, in the county of Coles and State of Illinois, have invented a new and Improved Seed-Planting Machine; and I do hereby declare that the following is a full, clear, and exact description of the same, reference being had to the annexed drawings, making a part of this specification, in which—

Figure 1 is a vertical section of my improvement, taken in the line $x\ x$, Fig. 4. Fig. 2 is a back view of the same, one of the distributing-wheels being bisected, and also the bed of the main frame of the machine. Fig. 3 is a detached section of one of the distributing-wheels, taken in the line $y\ y$. (See Fig. 4.) Fig. 4 is a plan or top view of the same.

Similar letters of reference indicate corresponding parts in the several figures.

This invention relates to an improvement in that class of seed-planting machines in which the seed is discharged at the peripheries of wheels which bear or run upon the ground.

The invention consists in having the hubs of the distributing-wheels connected by universal or compensating joints, and having the wheels placed each in a frame, the several frames being pivoted at one end to arms connected to a rock-bar, and the opposite ends resting upon a rock-bar, said rock-bars being operated as will be presently shown and described, whereby an independent vertical movement is allowed each wheel, so that they may conform to the inequalities of the ground and all the wheels raised simultaneously free from the surface of the ground, when necessary, so that the machine may be drawn from place to place without actuating the distributing devices.

To enable those skilled in the art to fully understand and construct my invention, I will proceed to describe it.

A represents the main frame of the machine, which is of rectangular form and mounted horizontally upon the wheels B B. The team is attached to the front end of the frame A.

C represents a bar which is attached transversely to the front end of the frame A by joints $a$, so that said bar may be allowed to rock on the frame A, and to the bar C a series of arms, D, are attached, and to the back part of the frame A a bar, E, is attached by arms $b'$.

To the arms D rectangular frames F are pivoted, and the back ends of the frames rest on the bar E, which has a cord or chain, $c$, attached to it, said cord or chain being attached to an arm, $d$, on the bar C. (See Figs. 1 and 4.)

To the bar C a segment, $e$, is also attached, and a cord or chain, $f$, is attached to said segment, the cord or chain being also attached to a bar, $g$, which is fitted within a suitable box, $h$, on the main frame A. The bar $g$ has a rack both on its upper and under surface, and the lower part of a lever, G, is pivoted to the box $h$, said lever being provided with two pawls, $i\ j$, one, $i$, being above the fulcrum-pin $k$ of the lever and catching into the upper rack of the bar $g$, and the other being below the fulcrum-pin and catching into the lower rack.

From the above description of parts it will be seen that by operating the lever G back and forth the bar $g$ will be moved and the two bars C E will be raised, and with them of course the frames F.

In each frame F a wheel, H, is placed, the axes of the wheels being fitted in the sides of the frames.

To each wheel H four spouts, $l$, are attached radially, and over one end of the hubs $a^\times$ of the wheels seed-hoppers $m$ are placed, an opening, $n$, being made through the bottom of each hopper. The hubs underneath the hoppers have holes made in them, and a portion of the periphery of each hub is encompossed by a metallic strap or curved plate, $o$. The lower ends of these straps or plates have short spouts $p$ attached. (See Fig. 3.)

The spouts $l$, which are attached to the wheels H, have plungers $q$ fitted in them, one in each. These plungers have cranks $r$ attached to them, the cranks being formed on rods S, which pass transversely through the spouts $l$, and their ends bent in opposite directions. The outer end of each spout is provided with a flap, $t$. These flaps are jointed or pivoted at their centers to the spout, as shown at $u$.

The hubs of the several wheels are connected by universal compensating-joints $b^\times$. These joints are formed of small frames $c^\times$, which are pivoted together at their ends, and also pivoted to elliptical bands $d$, which are pivoted in sockets $e^\times$, attached to the hubs $a^\times$. These joints are for the purpose of allowing the wheels to move up and down, each one independently of the other, and at the same time forming a connection between the wheels, so that they will all turn simultaneously.

The universal or compensating joint does not require a full description, as it is not new. It was formerly patented by me for the purpose of connecting the shafting of machinery placed at varying angles with each other. Besides, in this case other devices might answer equally as well as the one described. It will be seen therefore that the distributing-wheels are allowed to rise and fall independently of each other, and also that they may all be raised simultaneously by the driver by merely actuating the lever G.

I am aware that distributing-wheels provided with spouts, and having seed-cells formed in their hubs for distributing the seed into the spouts attached to the wheels have been previously used, the parts being arranged substantially as those herein shown. I therefore do not claim the distributing-wheels, nor do I claim the universal compensating joints $b^\times$; but,

Having thus described my invention, what I claim as new, and desire to secure by Letters Patent, is—

Placing the distributing-wheels H in frames F, the front ends of which are pivoted to arms D, attached to a rock-shaft, C, and having the back ends of the frames F rest or bear on the rock-shaft E, when the wheels thus arranged are connected by the universal compensating joints $b^\times$, or their equivalents, substantially as and for the purpose set forth.

P. HINKLEY.

Witnesses:
 GEO. W. TEEL,
 L. M. PHIPPS.